Figure 1:
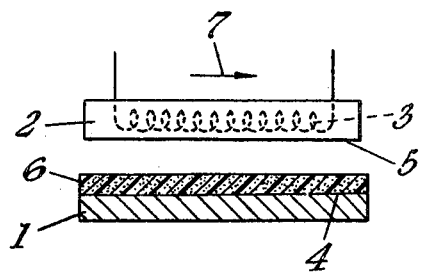

Sept. 17, 1963     K. H. HACKLÄNDER     3,104,192
METHOD OF FORMING A SMOOTH SURFACE ON
EXPANDED PLASTIC
Filed Oct. 15, 1956

Inventor
K. H. Hackländer
By Glascott Downing Seebold
Attys.

United States Patent Office 3,104,192
Patented Sept. 17, 1963

3,104,192
METHOD OF FORMING A SMOOTH SURFACE ON EXPANDED PLASTIC
Karl Hermann Hackländer, Vaduz, Liechtenstein, assignor to Agricola Reg. Trust, Vaduz, Liechtenstein
Filed Oct. 15, 1956, Ser. No. 615,914
Claims priority, application Great Britain Oct. 13, 1955
2 Claims. (Cl. 156—209)

This invention relates to expanded plastics and in particular to thermo-plastic expanded plastics.

Expanded plastic of the kind made from polyurethane for example, and sold under the name "Moltopren," suffers from the disadvantage that the exposed cut faces of the material do not stand up to heavy wear and the material is liable to tear. To overcome this it has been proposed to cover the material with a textile reinforcement. Furthermore, owing to the cellular nature of the material it is liquid absorbent. To overcome this it has been proposed to cover the faces of the material with a variety of surface coatings or plastic bondings without complete success.

The object of the present invention is to provide a process for treating thermo-plastic expanded plastics to render them tear-resisting, water repellant and abrasion resisting and non-absorbent.

The invention consists in a process for treating thermoplastic resilient plastic expanded by having pores therein comprising heating a surface of the expanded plastic to such a temperature as to render it plastic and applying pressure to the heated surface in conjunction with a wiping action whereby the pores are removed from a layer of the plastic adjacent the surface, the wiping action serving also to remove gas holes from the surface. The pressure may be applied by means of a flat or cylindrical, plain or engraved tool, preferably with a wiping action.

The invention further consists in slabs, sheets and other shapes treated by the above process and articles constructed therefrom.

In one method of carrying the process into effect the surface of the material is heated between engraved rollers which besides giving a slight ironing effect to the surface also closes the pores in such a way as to render the surface water repellent while at the same time retaining the resilient quality.

The raised embossed part of the design on the rollers compresses and forms a bas-relief or ground-work of such density as to melt the material to a compact nature of darker shade which gives the surface a striking two-tone effect which can be changed into contrasting color-section by tinting the raised part, while at the same time retaining the overall expansibility of the material.

The product of the process may be likened to a leather, in which the treated surface resembles the "grain" while the uncompressed part of the material resembles the "flesh" of the leather, and the surface becomes less "clinging" and more slippery fot the clothes and the like.

The leather-like effect may also be produced by bonding a relatively thin layer of plastic treated in accordance with the invention to an untreated and perhaps thicker layer of thermo-plastic expanded plastic, or other suitable backing material, by adhesives or by surface melting and applying pressure.

Alternatively the treating of the surface may take place with engraved plates or rollers whilst it is in contact with a thicker layer and in which the bonding takes place simultaneously with treatment of the surface.

A sheet of material used need not be of the finest quality and may have relatively small gas holes therein which may have been formed in the forming process because these holes become ironed out during the process.

Furthermore, the backing material can be of an inferior quality or even be constituted from chips, granules and waste material from other processes.

If both sides of the sandwich of sheets of such material are heated and compressed together the whole becomes welded together.

Material treated in accordance with the invention is useful for producing upholstery, car linings, wall paneling, carpeting, floor rugs, travelling bags, picnic bags and handbags, foot-wear, belts and so on.

Figure 3:
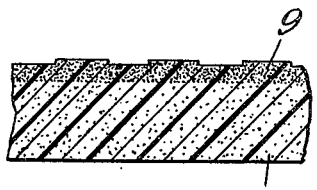
Figure 2:
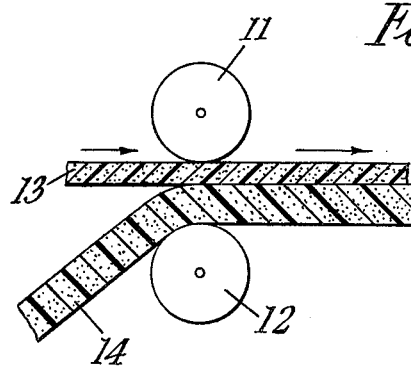
Figure 4:
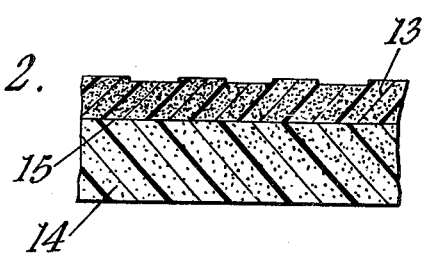

In the accompanying drawings:
FIGURE 1 shows diagrammatically one method and
FIGURE 2 shows a second method of carrying the invention into effect,
FIGURES 3 and 4 show respectively sections of two forms of leatherised material.

Referring first to FIGURE 1, reference numeral 1 denotes a stationary platen, which may be heated, 2 represents a movable platen, heated by means of heating element 3.

Surfaces 4 and 5 of platens 1 and 2 respectively may be engraved or plain according to requirements.

In operation the expanded plastic material 6 is introduced between surfaces 4 and 5 and the movable platen 2 is lowered into position and pressure applied, then it is moved in the direction of the arrow 7 to give a wiping action, and subsequently raised.

FIGURE 2 shows an engraved and heated roller 11 and a further roller 12. A sheet 13 of expanded plastic material and a thicker sheet 14 of suitable backing material as hereinbefore described are simultaneously fed between rollers 11 and 12 and pressure applied between the rollers causes simultaneous "leatherisation" of sheet 13 and bonding of sheets 13 and 14 together by adhesive or heat applied from a separate source.

FIGURE 3 shows the unaffected portion 8 and the "leatherised" layer 9 of material 6 after treatment.

FIGURE 4 shows sheet 13 in a leatherised state and sheet 14 in a substantially unaltered state but bonded to sheet 13 along surface 15.

In both cases the leatherised outer surfaces of the material are shown as engraved.

It is to be understood that the above description is by way of example only and that details for carrying the invention into effect may be varied without departing from the scope of the invention.

I claim:
1. A process for manufacturing a composite sheet of resilient thermoplastic expanded plastic comprising superimposing a relatively thin layer of expanded plastic on a backing layer of expanded plastic the adjacent surfaces of the layers being pre-heated to the plastic state, heating the exposed surface of the relatively thin layer and applying pressure to the exposed surface with a wiping action whereby the pores and gas holes are removed from the portion of the relatively thin layer adjacent the exposed surface and the relatively thin layer is simultaneously bonded to the backing layer.
2. Method of forming a smooth substantially impervious skin on the surface of resilient sheet foamed plastic, comprising passing the sheet through the nip of differentially driven rollers, at least one of which is heated, to produce a wiping action to the surface of the compressed foam while superficially melting the same.

References Cited in the file of this patent
UNITED STATES PATENTS

| | | |
|---|---|---|
| 1,645,604 | Lower | Oct. 18, 1927 |
| 1,696,129 | Silver | Dec. 18, 1928 |
| 1,979,691 | Jackson | Nov. 6, 1934 |

(Other references on following page)

UNITED STATES PATENTS

| | | |
|---|---|---|
| 2,268,049 | McGuire | Dec. 30, 1941 |
| 2,376,653 | Boyer | May 22, 1945 |
| 2,626,886 | Scholl | Jan. 27, 1953 |
| 2,629,678 | Thompson et al. | Feb. 24, 1953 |
| 2,629,899 | Aller | Mar. 3, 1953 |
| 2,642,920 | Simon et al. | June 23, 1953 |
| 2,680,471 | Mercer | June 8, 1954 |
| 2,681,877 | Seymour | June 22, 1954 |
| 2,698,272 | Clapp et al. | Dec. 28, 1954 |
| 2,703,775 | Panagrossi et al. | Mar. 8, 1955 |
| 2,759,475 | Van Swaay | Aug. 21, 1956 |
| 2,767,436 | Noland | Oct. 23, 1956 |
| 2,780,275 | Rusch et al. | Feb. 5, 1957 |
| 2,785,739 | McGregor et al. | Mar. 19, 1957 |
| 2,878,153 | Hacklander | Mar. 17, 1959 |